(12) United States Patent
Baskaran et al.

(10) Patent No.: US 9,472,103 B1
(45) Date of Patent: Oct. 18, 2016

(54) GENERATION OF VEHICLE HEIGHT LIMIT ALERTS

(71) Applicant: International Business Machines Corporation, Armonk, NY (US)

(72) Inventors: Kogulan Baskaran, Strathfield South (AU); Kwan Yin Andrew Chau, Parramatta (AU); Stephen Jusuf, Sydney (AU); Stephen Pham, Cabramatta (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/967,745

(22) Filed: Dec. 14, 2015

(51) Int. Cl.
| | |
|---|---|
| *G08G 1/16* | (2006.01) |
| *G07B 15/00* | (2011.01) |
| *G07B 15/06* | (2011.01) |
| *B60Q 9/00* | (2006.01) |
| *G01C 21/34* | (2006.01) |

(52) U.S. Cl.
CPC ............... *G08G 1/16* (2013.01); *B60Q 9/008* (2013.01); *G01C 21/3415* (2013.01); *G07B 15/06* (2013.01)

(58) Field of Classification Search
CPC ....................................................... G08G 1/16
See application file for complete search history.

(56) References Cited

U.S. PATENT DOCUMENTS

| | | | |
|---|---|---|---|
| 1,284,971 | A | 8/1981 | Lowry et al. |
| 6,195,019 | B1 * | 2/2001 | Nagura ............. G07B 15/063 |
| | | | 235/384 |
| 7,259,660 | B2 | 8/2007 | Ewerhart et al. |
| 8,354,920 | B2 | 1/2013 | Kole |
| 8,810,382 | B1 | 8/2014 | Laurita |

(Continued)

OTHER PUBLICATIONS

Dai et al., "A vision-based method for on-road truck height measurement in proactive prevention of collision with overpasses and tunnels", Automation in Construction, vol. 50, Feb. 2015, Available online Nov. 26, 2014, pp. 29-39, doi:10.1016/j.autcon.2014.10.005, © 2014 Elsevier B.V.

(Continued)

*Primary Examiner* — Jennifer Mehmood
*Assistant Examiner* — Pameshanand Mahase
(74) *Attorney, Agent, or Firm* — Steven L. Fisher-Stawinski (57) ABSTRACT

A method includes identifying, by an electronic tolling system, a node. The node is associated with a vehicle. The node is configured to identify the vehicle to the electronic tolling system. The method identifies, by the electronic tolling system, a vehicle height calculation system. The method receives, by the electronic tolling system, a height for the vehicle from the vehicle height calculation system. The method receives by the electronic tolling system, a height limit. The height limit is associated with one or more roadways for which the electronic tolling system is configured to collect tolls. The method compares, by the electronic tolling system, the vehicle height to the height limit. The method is responsive to the vehicle height is greater than the height limit, by generating, by the electronic tolling system, an alert. The method sends the alert from the electronic tolling system to an alert display.

18 Claims, 5 Drawing Sheets

(56) References Cited

U.S. PATENT DOCUMENTS

| | | | |
|---|---|---|---|
| 2001/0026228 A1* | 10/2001 | Naito | G08G 1/017 340/928 |
| 2004/0201495 A1* | 10/2004 | Lim | G08G 1/0967 340/905 |
| 2005/0171654 A1* | 8/2005 | Nichols | G08G 5/0078 701/15 |
| 2006/0278705 A1* | 12/2006 | Hedley | G07B 15/063 235/384 |
| 2009/0313096 A1* | 12/2009 | Kaga | G07B 15/063 705/13 |
| 2012/0081218 A1* | 4/2012 | Nugent | B60Q 9/006 340/431 |
| 2013/0110346 A1 | 5/2013 | Huber | |
| 2013/0222592 A1 | 8/2013 | Gieseke | |

OTHER PUBLICATIONS

Singhal, Abhishek, "LaRa-OHVD: An Innovative Over-Height Vehicle Detection System to Protect Our Bridges to Prosperity", A student essay submitted for ITS-NY 2015 Best Student Essay Competition at 2015 Intelligent Transportation Society of New York 22nd Annual Meeting, Saratoga Springs NY, 9 pages.

"Guideline for Over Height Detection System", VicRoads Guideline, TCG 001—2015, Revision: A, Revision Date: Jun. 2015, 14 pages, © Roads Corporation trading as VicRoads, <https://www.vicroads.vic.gov.au/~/media/files/technicaldocuments/guidelines/technical-guiideline-tcg0012015.ashx>.

\* cited by examiner

GENERATION OF VEHICLE HEIGHT LIMIT ALERTS

BACKGROUND

The present invention relates generally to the field of vehicle monitoring systems and more particularly to generating vehicle height limit alerts.

Vehicles travelling along a roadway can cause substantial damage to the vehicle, operators of the vehicle, other drivers, other vehicles, and property. In particular, if a vehicle is exceeds a height limit and collides with an overhead obstruction such as an overpass or a tunnel, significant damage may result.

SUMMARY

A method includes identifying, by an electronic tolling system, a node. The node is associated with a vehicle. The node is configured to identify the vehicle to the electronic tolling system. The method identifies, by the electronic tolling system, a vehicle height calculation system. The method receives, by the electronic tolling system, a height for the vehicle from the vehicle height calculation system. The method receives by the electronic tolling system, a height limit. The height limit is associated with one or more roadways for which the electronic tolling system is configured to collect tolls. The method compares, by the electronic tolling system, the vehicle height to the height limit. The method is responsive to the vehicle height is greater than the height limit, by generating, by the electronic tolling system, an alert. The method sends the alert from the electronic tolling system to an alert display.

DETAILED DESCRIPTION

Figure 1:
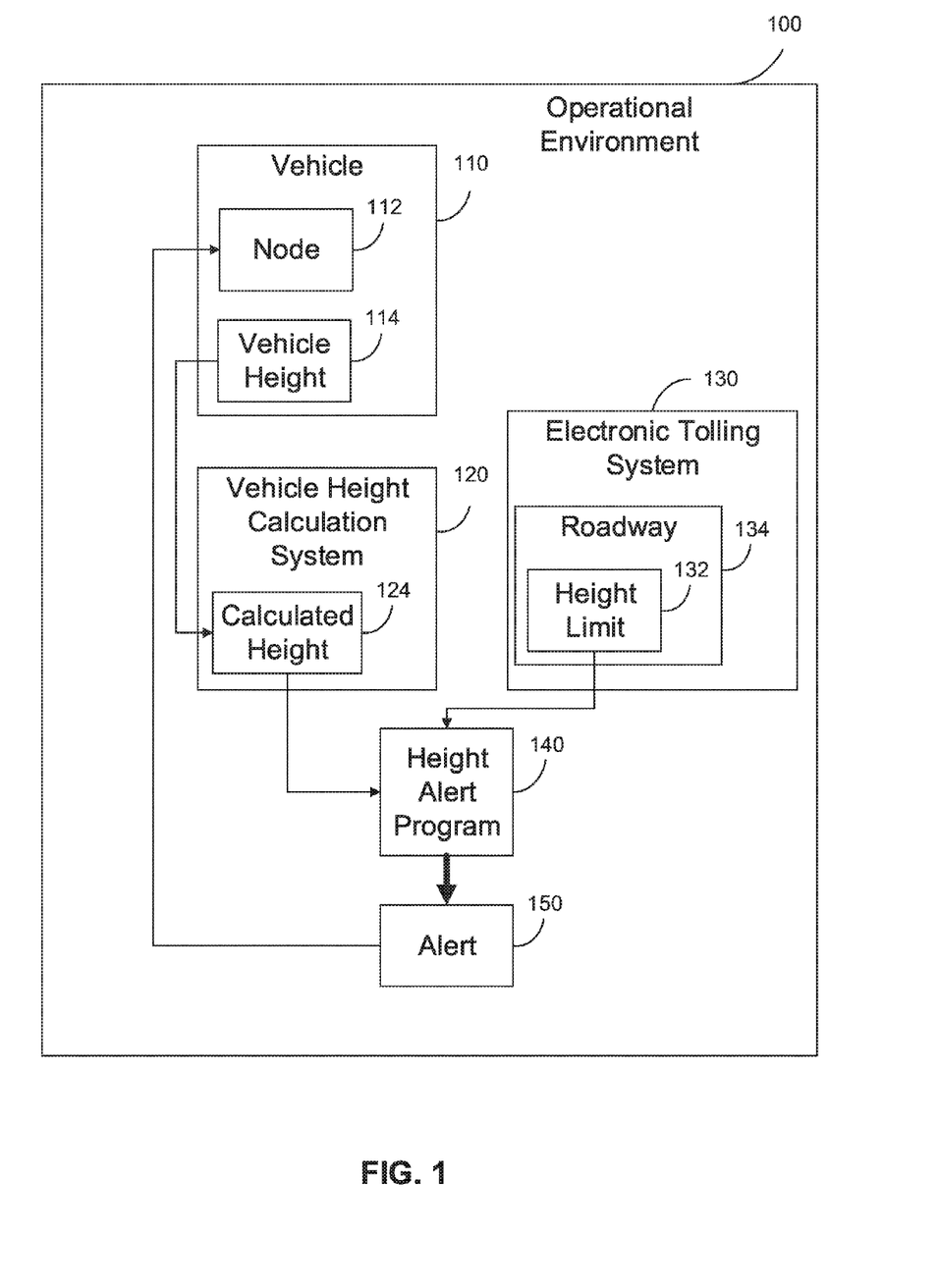
FIG. 1 is a block diagram of an operational environment suitable for operation of a height alert program, in accordance with at least one embodiment of the present invention.

Referring now to the invention in more detail, FIG. 1 is a block diagram displaying an operational environment suitable for operation of at least one embodiment of the present invention. The operational environment 100 includes a vehicle 110, which includes a node 112, and a vehicle height 114, a vehicle height calculation system 120, which includes the calculated height 124, an electronic tolling system 130, which includes a roadway 134, which includes a height limit 132, a height alert program 140, and an alert 150, all in mutual communication and interconnected via the operational environment 100. Various components of the operational environment, such as the electronic tolling system 130, vehicle height calculation system 120, and node 112, may include one or more computers, which may variously be cloud-based, virtual, or distributed environment or a remote environment on defined server hardware, or, more generally, any type of general purpose operational environment, such as that depicted in FIG. 5.

The vehicle 110 may be a motorized transportation machine. For example, the vehicle 110 may be an automobile, truck, bus, train, tram, or boat. The vehicle height 114 is a physical property, namely, the height of the vehicle 110. The vehicle height 114 may change depending on the presence and size of any external load on the vehicle 110. For example, the vehicle height 114 increases if a user of the vehicle 110 places a bicycle on top of the vehicle 110. In some embodiments, the vehicle height 114 may be expressed as an inequality or range, rather than as a single measured value. For example, a vehicle height A for a vehicle A may be that the vehicle height A is greater than seven feet.

The vehicle height calculation system 120 is a system for determining the vehicle height 114. In some embodiments, the vehicle height calculation system may be a roadside device. For example, the vehicle height calculation system 120 may determine the vehicle height 114 by taking a picture of the vehicle 110 and calculating the vehicle height 114 based on a reference object of known height, wherein the reference object appears in the picture, for example as in the scene of FIG. 4 wherein the roadside device 418 may be within the field of view of a camera positioned at the vehicle height calculation system 416. In embodiments where the vehicle height is represented as a range or as exceeding a threshold, the vehicle height calculation system 120 may determine the vehicle height 114 via a linear interrupt sensor. For example, the vehicle height calculation system 120 may determine if the vehicle height 114 is below seven feet or seven feet and above. In such an embodiment, a linear interrupt sensor may extend entirely or partially a roadway, at an exemplary height of seven feet above the roadway such that any vehicle with a vehicle height seven feet or above interrupts the linear interrupt sensor and indicate to the vehicle height calculation system 120 that the vehicle height 114 is seven feet or above. The vehicle height 114 may be communicated to the height alert program 140 via the electronic tolling system 130. The electronic tolling system 130 is a system of roadside and car tagging devices to determine when a particular vehicle is travelling along a particular roadway. In general, the electronic tolling system 130 includes a node, such as the node 112, which is placed within a vehicle, such as the vehicle 110.

The node 112 is a connection and/or communication point that is capable to creating, receiving, and/or transmitting information via the operational environment 100. In some embodiments, the node 112 is included in the electronic tolling system 130. In such an embodiment the node 112 may be located within the vehicle 110 and indicate to the electronic tolling system 130 if the vehicle 110 has traveled onto a roadway that requires the vehicle 110 to be tolled. In some embodiments, the node 112 is an active radio-frequency identification transponder and indicates the presence of the vehicle 110 to the electronic tolling system 130 by transmitting a radio signal or unique radio signature. The electronic tolling system 130 may be a system for collecting tolls.

The roadway 134 is any path, route, or thoroughfare on which vehicles, such as the vehicle 110 may travel. The roadway 134 may include, as a physical property, any characteristics that may make the roadway 134 potentially hazardous for users of vehicles, such as the vehicle 110. For example, the roadway 134 includes overpasses or tunnels that are along the roadway 134 as well as any physical restrictions this may impose on the vehicle 110. For example, the roadway 134 includes the height limit 132.

The height limit 132 is a pre-determined height limit. In some embodiments, the height limit 132 is determined based on the height of an overpass or tunnel that is along the roadway 134. In other embodiments, the height limit 132 is used as a proxy for overall size and determined based on the weight limit of a bridge. The height limit 132 may be determined by a user and is communicated to the height alert program 140.

The height alert program 140 may receive the vehicle height 114 and the height limit 132 as input. The vehicle height 114 as input is the calculated height 124, which is within the height alert program 140. The calculated height 124 corresponds to the vehicle height 114. The height alert program 140 compares the calculated height 124 and the height limit 132, and generates an alert 150 as output. The height alert program 140 acts by comparing the calculated height 124 and the height limit 132. The height alert program 140 may send the alert 150 to the node 112. The height alert program 140 may act by sending the alert 150 to the node 112. The height alert program 140 may be a function integrated within another program, or any program or function that can communicate with the electronic tolling system, the node 112, and/or the height alert program via the operational environment 100.

The alert 150 may be any notification capable of being emitted from an alert device. In some embodiments the alert device is the node 112. In such an embodiment, the node 112 may be equipped with audio speakers or a light fixture such that the node 112 may emit an audio and/or visual alert. In some embodiments, the alert 150 may include instructions to redirect the vehicle 110 to an alternate roadway wherein the alternate roadway is a different roadway, an alternate route, and/or an alternative route. For example, the alert 150 may be an audio recording providing verbal instructions to a driver to navigate the vehicle 110 to an alternate roadway. The alert 150 may be an indication redirecting or to redirect the vehicle 110 to an alternate roadway. In other embodiments, the electronic tolling system 130 may include digital signs which indicate to a user, for example, the cost of their vehicle using a roadway, the type of currency accepted in a particular lane, or whether the user of the vehicle has successfully paid. In such embodiments, the alert 150 may be displayed via the digital signs within the electronic tolling system 130.

In other embodiments, the operational environment 100 may include an electronic roadside alert system. The electronic roadside alert system may be, for example, a digital display placed alongside a roadway to indicate to drivers safety warnings, traffic warnings, construction warnings, weather warnings, etc. In such an embodiment, the electronic roadside alert system may be in mutual communication with other devices within the operational environment 100. In such an embodiment, the alert 150 may be displayed via the electronic roadside alert system.

Figure 2:
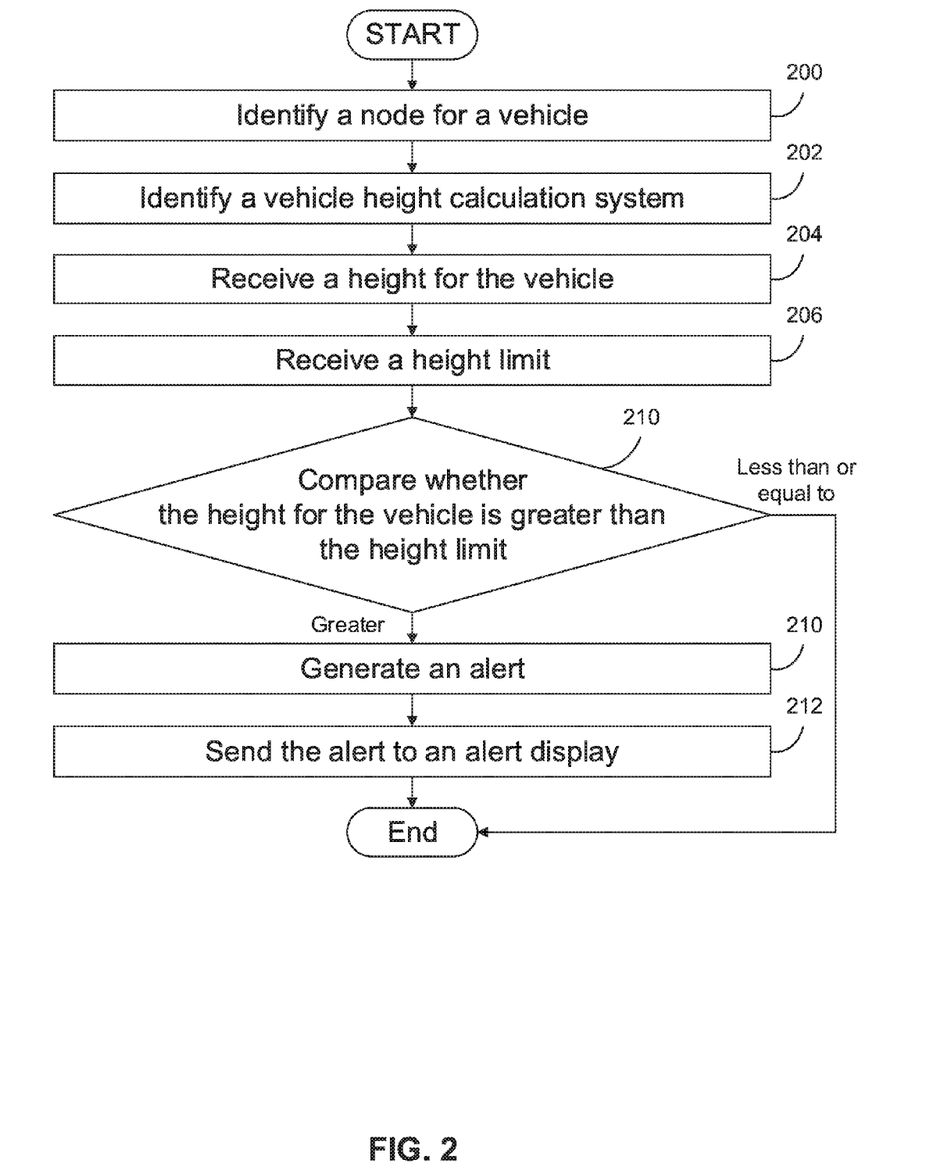
FIG. 2 is a flowchart depicting operational steps for a height alert program, in accordance with at least one embodiment of the present invention.

FIG. 2 is a flowchart depicting the operational steps of the height alert program 140, executing via the electronic tolling system 130 within the operational environment 100 of FIG. 1, in accordance with an embodiment of the present invention.

At step 200, the height alert program identifies the node 112, the node 112 being associated with the vehicle 110. The height alert program 140 identifies the node 112 via the electronic tolling system 130. Identifying may include automated calls to height alert program 140, for example, from an integrated development environment or as part of the electronic tolling system 130.

At step 202, the height alert program 140 identifies the vehicle height calculation system 120. The height alert program 140 identifies the vehicle height calculation system 120 via the electronic tolling system 130. Identifying may include automated calls to height alert program 140, for example, from an integrated development environment or as part of the electronic tolling system 130.

At step 204, the height alert program 140 receives the vehicle height 114. The height alert program 140 receives the vehicle height 114 via the electronic tolling system 130. Receiving may include a user explicitly calling the height alert program 140 from a command line interface using a reference to the vehicle height 114 as an argument. Alternatively, receiving may include automated calls to the height alert program 140, for example, from an integrated development environment or as part of a height alert management system.

At step 206, the height alert program 140 receives the height limit 132. The height alert program 140 receives the height limit 132 via the electronic tolling system 130.

At step 208, the height alert program 140 compares the vehicle height 114 and the height limit 132. At step 210 the height alert program 140 determines if the vehicle height 114 is greater than the height limit 132. In some embodiment, the height alert program 140 compares the vehicle height 114 and the height limit 132 by calculating the mathematical difference between the two values. In embodiments where the vehicle height 114 is represented as a range or as exceeding a threshold value, the height alert program 140 compares the range of the vehicle height 114 to the height limit 132. For example, the height limit 132 may be seven feet. The vehicle height 114 may be that the vehicle is above seven feet. In such an embodiment, the height alert program 140 determines that the vehicle height 114 is greater than the height limit 132.

If yes, the vehicle height 114 is greater than the height limit 132, the height alert program 140 proceeds to step 210. At step 210, the height alert program generates the alert 150. In some embodiment, the alert 150 is an alarm sound. In other embodiments, the alert 150 may be words written or vocalized via the electronic tolling system 130.

At step 212, the vehicle height 114 sends the alert 150 to an alert display. In some embodiments, the alert display is the node 112. In other embodiments, the alert display may be a separate client device capable of receiving the alert 150 via the electronic tolling system 130.

Figure 3:
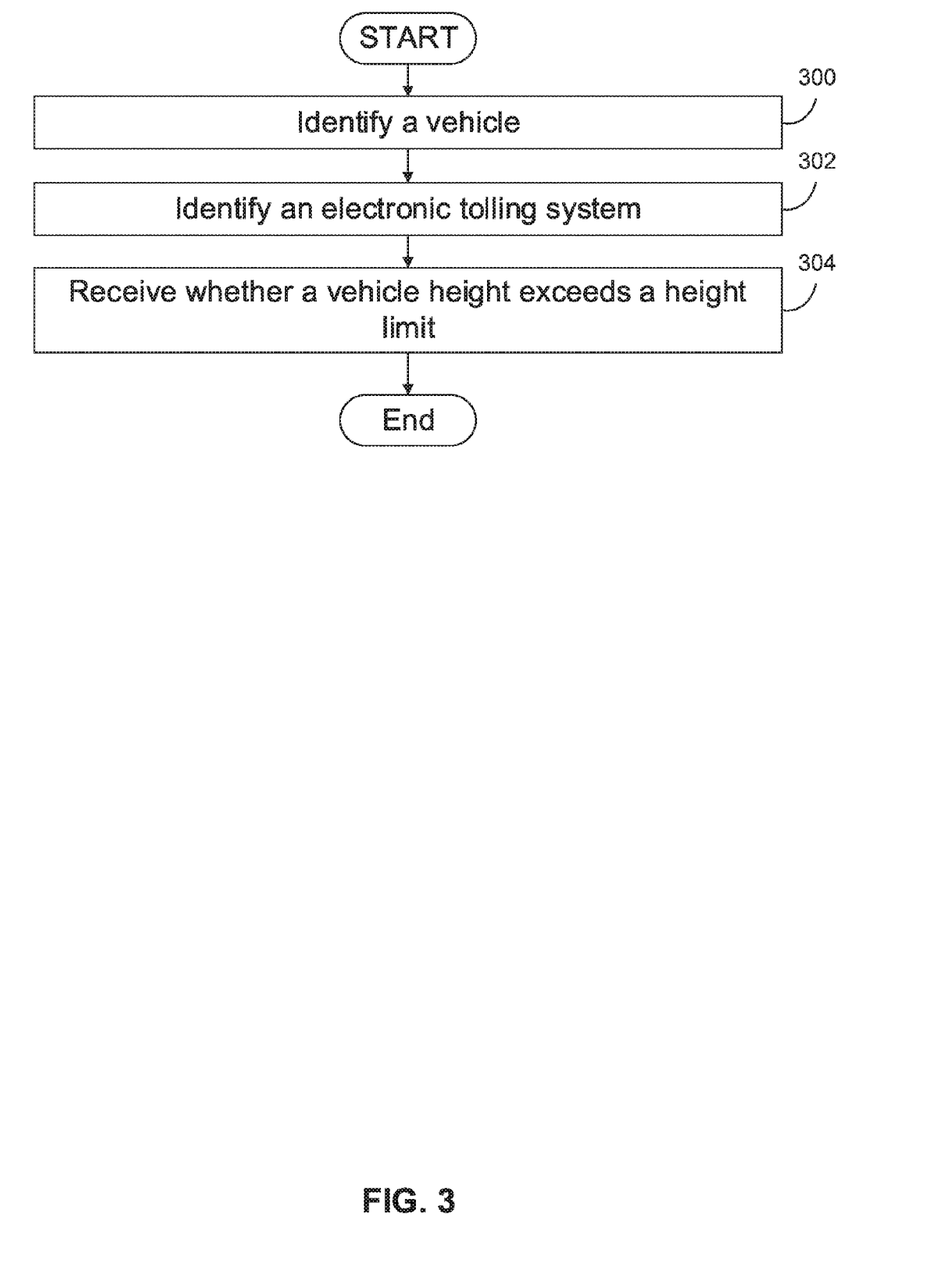
FIG. 3 is a flowchart depicting operational steps for a height alert program operating via a node, in accordance with at least one embodiment of the present invention.

FIG. 3 is a flowchart depicting the operational steps of height alert program 140, operating via the node 112, in accordance with an embodiment of the present invention.

At step 300, the height alert program 140 identifies, via the node 112, the vehicle 110.

At step 302, the height alert program 140 identifies, via the node 112, the electronic tolling system 130.

At step 304, the height alert program 140 receives information, via the node 112, from the electronic tolling system 130. At step 304, the height alert program 140 receives whether the calculated height 124 is greater than the height limit 132, which may be calculated via the operational steps 200-210 of the height alert program 140.

In some embodiments, the height alert program 140 may act, responsive to receiving information that the vehicle height 114 is greater than the height limit 132. In such an embodiment, the height alert program 140 may generate, via the node 112 an alert, such as the alert 150. The node 112 may be configured to emit an alert, such as the alert 150.

Figure 4:
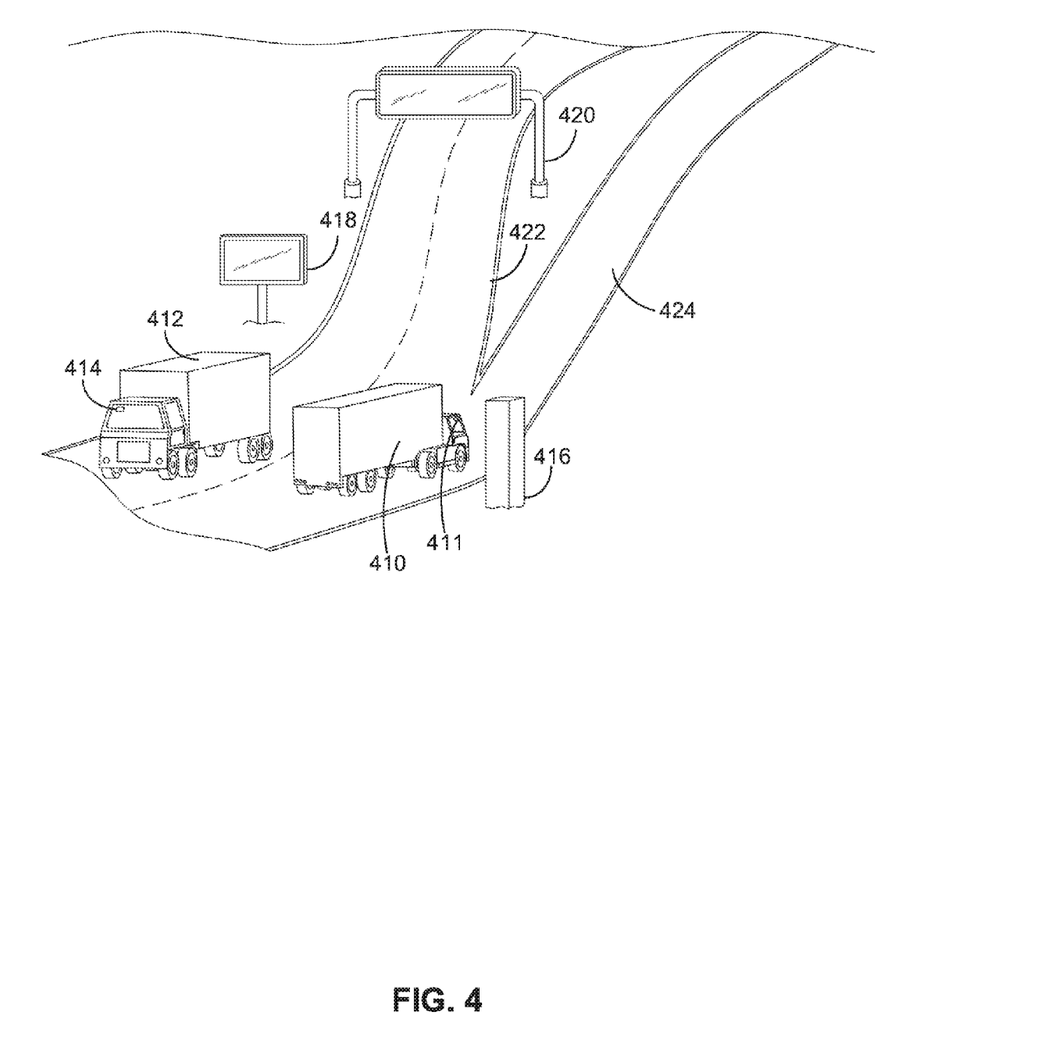
FIG. 4 is a perspective view of a height alert system, in accordance with an embodiment of the present invention.

FIG. 4 is a perspective view of a height alert system, in accordance with an embodiment of the present invention. FIG. 4 includes a vehicle 410, a second vehicle 412, a node 411, a second node 414, a vehicle height calculation system 416, a roadside device 418, an electronic tolling system 420, a roadway 422, and an alternate roadway 424.

The vehicle 410 and the second vehicle 412 are vehicles such as the vehicle 110. The node 411 and the second node 414 are nodes such as the node 112. In the embodiment of FIG. 4, the second node 414 is located within the second vehicle 412, placed on the second vehicle 412's front windshield. The node 411 is located within the vehicle 410, place on the vehicle 410's front windshield. Both the vehicle 410 and the vehicle 412 have a vehicle height, such as the vehicle height 114.

The electronic tolling system 420 is an electronic tolling system, such as the electronic tolling system 130. The vehicle height calculation system 416 is a vehicle height calculation system, such as the vehicle height calculation system 120. The roadway 422 and the alternate roadway 424 are roadways, similar to the roadway 134. The roadway 422 and the alternate roadway 424 may have a height limit, such as the height limit 132.

The roadside device 418 may be an electronic roadside alert system. The electronic roadside alert system may be, for example, a digital display placed alongside a roadway to indicate safety warnings, traffic warnings, construction warnings, weather warnings, etc.

Figure 5:
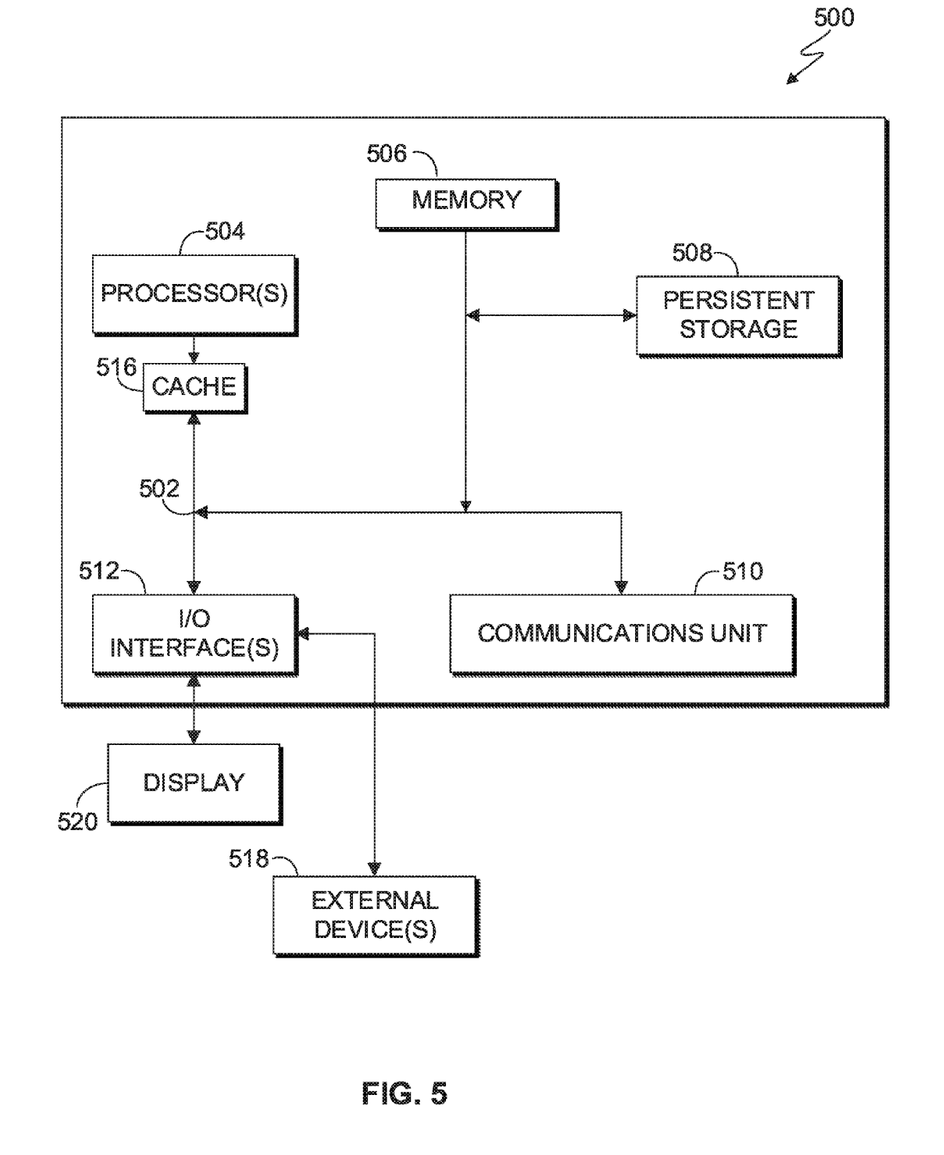
FIG. 5 is a block diagram of components of a computing apparatus suitable for executing a height alert program, in accordance with at least one embodiment of the present invention.

FIG. 5 is a block diagram depicting components of a computer 500 suitable for executing the height alert program 140. FIG. 5 displays the computer 500, the one or more processor(s) 504 (including one or more computer processors), the communications fabric 502, the memory 506, the RAM 516, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g. microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the height alert program 140 may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. Height alert program 140 may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions and/or computer program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    identifying, by an electronic tolling system, a node, said node being associated with a vehicle, said node being configured to identify said vehicle to said electronic tolling system;
    identifying, by said electronic tolling system, a vehicle height calculation system;
    receiving, by said electronic tolling system, a height for said vehicle from said vehicle height calculation system, wherein said height is determined by a linear interrupt sensor and taking a picture of said vehicle and comparing said picture to a reference object of a known height, said reference object being a roadside device;

receiving, by said electronic tolling system, a height limit, said height limit being associated with one or more roadways for which said electronic tolling system is configured to collect tolls;
comparing, by said electronic tolling system, said vehicle height to said height limit;
responsive to said vehicle height being greater than said height limit, generating, by said electronic tolling system, an alert; and
sending said alert from said electronic tolling system to an alert display.

2. The method of claim 1, wherein said vehicle height calculation system comprises a roadside device.

3. The method of claim 1, wherein said alert display comprises said node.

4. The method of claim 1, further comprising redirecting said vehicle to an alternate route.

5. The method of claim 4, wherein redirecting said vehicle to an alternate route comprises sending, by said electronic tolling system, said alternative route to said alert display, via said electronic tolling system.

6. The method of claim 1, further comprising:
identifying an electronic roadside alert system; and
sending said alert from said electronic tolling system to at least one of said electronic roadside alert system or said alert display.

7. The method of claim 1, wherein said reference object appears in said picture.

8. A method comprising:
identifying, by said node, an electronic tolling system; and
receiving, by said node, from said electronic tolling system, whether a vehicle height, said vehicle height being for a vehicle associated with said node, exceeds a height limit, said height limit being associated with one or more roadways for which said electronic tolling system is configured to collect tolls, wherein said height is determined by a linear interrupt sensor and taking a picture of said vehicle and comparing said picture to a reference object of a known height, said reference object being a roadside device.

9. The method of claim 8, wherein said electronic tolling system comprises a roadside device, said roadside device being configured for at least one of:
calculating said vehicle height; or
displaying an alert.

10. The method of claim 8, further comprising:
responsive to said vehicle height limit being greater than said height limit, generating, by said node, an alert.

11. The method of claim 10, wherein said alert comprises redirecting said vehicle to an alternate route.

12. The method of claim 8, wherein said reference object appears in said picture.

13. A system comprising:
a vehicle, said vehicle being of a vehicle height;
a node, said node being associated with said vehicle;
one or more roadways;
an electronic tolling system, said electronic tolling system being configured for collecting tolls on said one or more roadways;
a height limit, said height limit being associated with said one or more roadways;
a vehicle height calculation system, wherein said height is determined by a linear interrupt sensor and taking a picture of said vehicle and comparing said picture to a reference object of a known height, said reference object being a roadside device;
one or more computer processors;
one or more computer readable storage media;
computer program instructions; and
said computer program instructions being stored on said computer readable storage media for execution by at least one of said one or more processors, said computer program instructions comprising instructions to:
compare said vehicle height and said height limit; and
responsive to said vehicle height being greater than said height limit, generate an alert.

14. The system of claim 13, wherein said node is configured to emit said alert.

15. The system of claim 13, wherein said vehicle height calculation system comprises a roadside device.

16. The system of claim 13, further comprising instructions to redirect said vehicle to an alternate route.

17. The system of claim 16, wherein instructions to redirect said vehicle to an alternate route further comprise instructions to:
identify an electronic roadside alert system; and
send said alternate route to said electronic roadside alert system.

18. The system of claim 13, wherein said reference object appears in said picture.

* * * * *